(12) United States Patent
Lewis et al.

(10) Patent No.: US 8,121,069 B2
(45) Date of Patent: Feb. 21, 2012

(54) ADAPTIVE DATA DELIVERY

(75) Inventors: Allan David Lewis, New Dundee (CA); Gary Mousseau, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1312 days.

(21) Appl. No.: 11/236,363

(22) Filed: Sep. 27, 2005

(65) Prior Publication Data

US 2007/0070931 A1 Mar. 29, 2007

(51) Int. Cl.
*H04W 4/00* (2009.01)
(52) U.S. Cl. ........ 370/328; 370/338; 370/465; 370/310; 455/414.1; 455/466; 455/422.1; 455/435.1
(58) Field of Classification Search .................. None
See application file for complete search history.

(56) References Cited

U.S. PATENT DOCUMENTS

| | | | |
|---|---|---|---|
| 6,138,146 A | 10/2000 | Moon et al. | |
| 6,907,501 B2 * | 6/2005 | Tariq et al. | 711/118 |
| 7,480,251 B2 * | 1/2009 | Foschiano et al. | 370/248 |
| 2002/0002591 A1 | 1/2002 | Ketola | |
| 2004/0116119 A1 | 6/2004 | Lewis et al. | |
| 2004/0202117 A1 * | 10/2004 | Wilson et al. | 370/310 |
| 2005/0038863 A1 | 2/2005 | Onyon et al. | |
| 2006/0224681 A1 | 10/2006 | Wurster | |

FOREIGN PATENT DOCUMENTS

| | | |
|---|---|---|
| EP | 0903906 A2 | 3/1999 |
| EP | 1047239 A1 | 10/2000 |
| WO | 2005065296 A2 | 7/2005 |

OTHER PUBLICATIONS

European Search Report Patent Appl. No. 07/122,411.7, Feb. 22, 2008.
"3rd Generation Partnership Project; Technical Specification Group Services and System Aspects Push Architecture (Release 6)", vol. 6.0.0, Mar. 2004, pp. 1-34.
"Push Access Protocol", Wireless Application Protocol WAP-247-PAP-20010429-A, Apr. 29, 2001, pp. 1-49.
"3rd Generation Partnership Project; Technical Specification Group Services and System Aspects; Support of Push Service (Release 5)", vol. 5.1.0, Mar. 2002, pp. 1-70.
"Push OTA Protocol", Wireless Application Protocol WAP-235-PushOTA-20010425-a, Apr. 25, 2001, pp. 1-44.

* cited by examiner

*Primary Examiner* — Willie J Daniel, Jr.
(74) *Attorney, Agent, or Firm* — John J. Oskorep, Esq.

(57) ABSTRACT

A system and a method for a wireless communication system (700) for adaptively delivering data to a wireless mobile communication device (702) based upon an availability status of the mobile device (702) in the wireless communication system (700) are disclosed. The wireless communication system (700) includes a host service (704) having data for the mobile device (702); a wireless router system (710) coupled to the host service (704) for determining the availability status of the mobile device (702) in the wireless communication system (700); and a wireless network (724) coupling the wireless router system (710) and the mobile device (702). The host service (704) transmits the data for the mobile device (702) if the availability status of the mobile device (702) is available, and queues the data in the host service (704) if the availability status of the mobile device (702) is unavailable until the availability status of the mobile device (702) becomes available.

41 Claims, 7 Drawing Sheets

ADAPTIVE DATA DELIVERY

FIELD OF THE INVENTION

The present invention generally relates to a wireless communication system, and more specifically to a system and a method for adaptively delivering data to a wireless mobile device based upon the availability of the wireless mobile communication device in the wireless communication system.

BACKGROUND OF THE INVENTION

In a wireless communication system designed to deliver data to a wireless mobile communication device ("mobile device") such as a cellular telephone, a two-way pager, a wireless communication capable personal digital assistant ("PDA"), and other similar device, there are several main components in the wireless communication system. A host service, which provides services such as e-mail, calendar, and Internet web browsing, holds the data to be delivered to the mobile device. The host service is coupled to a router, which couples the host service and a wireless network that is designed to communicate with the mobile device. To make a timely delivery of the data, the host service forwards the data for the mobile device to the router when the data becomes available. The router then forwards the data to the wireless network, which transmits the data to the mobile device. If the mobile device fails to receive the data, the router queues the data and re-forwards the data to the wireless network, which re-transmits the data to the mobile device. This process continues until the mobile device receives the data and acknowledges the reception or the process times out after a predetermined time period. While the data is being transmitted and queued, another data may become available for the mobile device in the host service, and may be forwarded to the router. The other data is then forwarded to the wireless network and is transmitted to the mobile device, but fails to be received by the mobile device. The host service continues to transmit more data, as they become available, to the router without the knowledge of the mobile device thereby wasting the host service resources, undeliverable data continues to accumulate in the router wasting the router resources, and the capacity in the wireless network is wasted by repeatedly transmitting the data without having any indication that the delivery of the data will be successful.

DETAIL DESCRIPTION OF THE PREFERRED EMBODIMENTS

A wireless communication system, comprising a host service, a wireless router system coupled to the host service, a wireless network coupling the wireless router system and a wireless mobile communication device ("mobile device"), adaptively delivers data to the mobile device in the wireless communication system. When the host service has data to be delivered to the mobile device, it first determines the availability status of the mobile device at the host service. The availability status may be based upon its previous data delivery to the mobile device, a cached availability status at the wireless router system, which may check whether the mobile device is registered in the wireless network. The wireless network may be, but not limited to, a cellular telephone network, a two-way paging network, a short range wireless network such as Bluetooth™ and IEEE 802.11 compliant network, and others alike, through which the mobile device is accessible by the wireless router system. If the mobile device is determined to be available, then the host service transmits the data to the wireless router system, which delivers the data though the wireless network to the mobile device. However, if the mobile device is determined to be unavailable, then the host service queues the data but does not send the data until the mobile device is re-determined to be available, thereby avoiding unnecessary transmission of the data directed to the mobile device.

Figure 1:
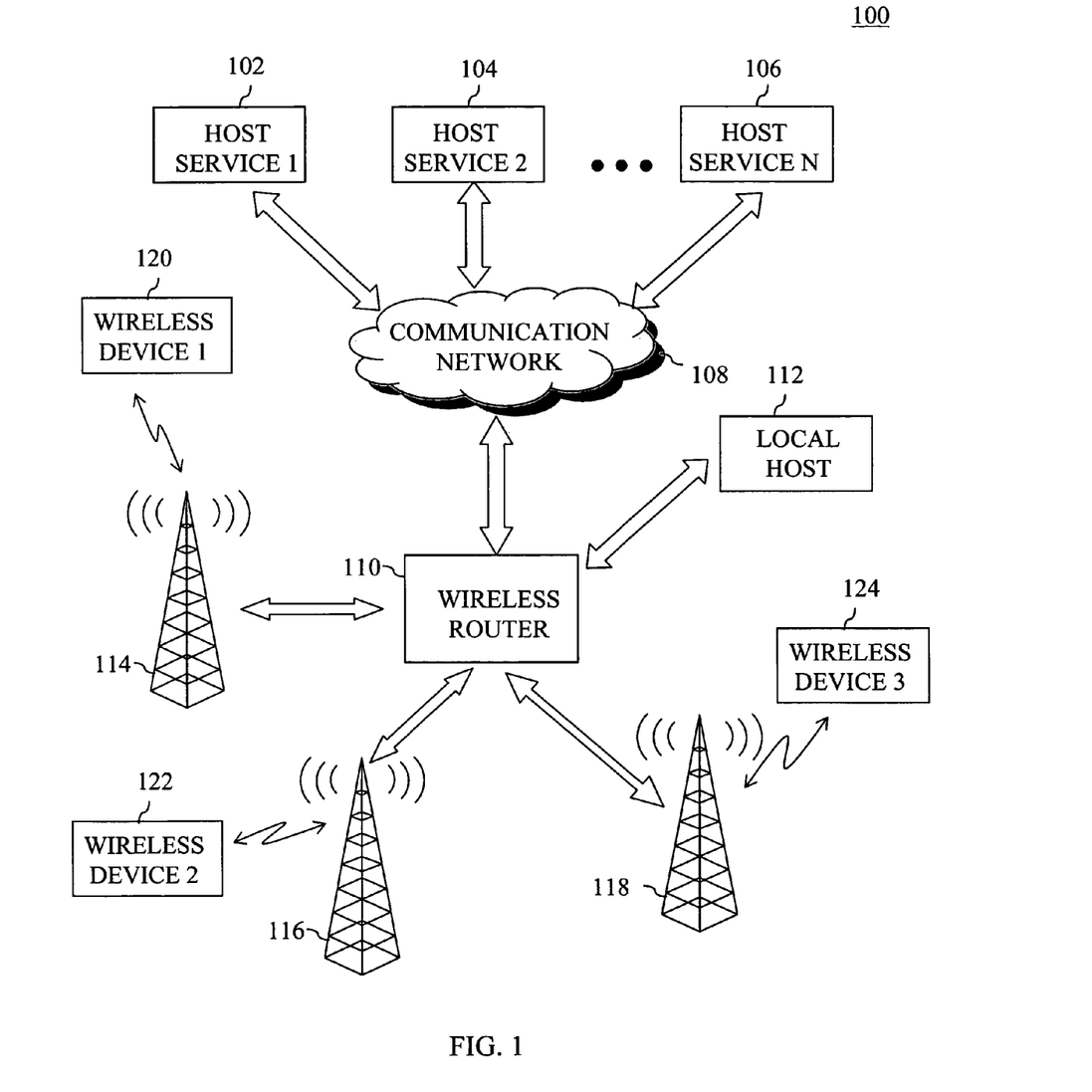
FIG. 1 is an exemplary environment in which a wireless communication system in accordance with at least one of the preferred embodiments may be practiced.

FIG. 1 is an exemplary wireless communication system 100 in which a wireless communication system in accordance with at least one of the preferred embodiments may be practiced. The exemplary wireless communication system 100 includes a plurality of host services (three shown, 102, 104, and 106), each of which may have a plurality of services such as, but not limited to, e-mail, calendar, Internet web browser, and other applications, available to their subscribers. The host services 102, 104, and 106 are connected to a communication network 108 such as Internet, which connects to a wireless router system 110 allowing communication between the host services 102, 104, and 106 and the wireless router 110. The wireless router system 110 may also be connected to a host service, such as a local service 112, without the communication network 108. The wireless router system 110 is connected to a plurality of wireless networks (three shown, 114, 116, and 118), each of which may support a plurality of mobile devices (one in each wireless network is shown, 120, 122, and 124). The wireless networks 114, 116, and 118 may be a cellular telephone network, a two-way paging network, a short range wireless network such as Bluetooth™ and IEEE 802.11 compliant network, and others alike, and the mobile devices 120, 122, and 124 are device compatible with the corresponding wireless network.

Figure 2:
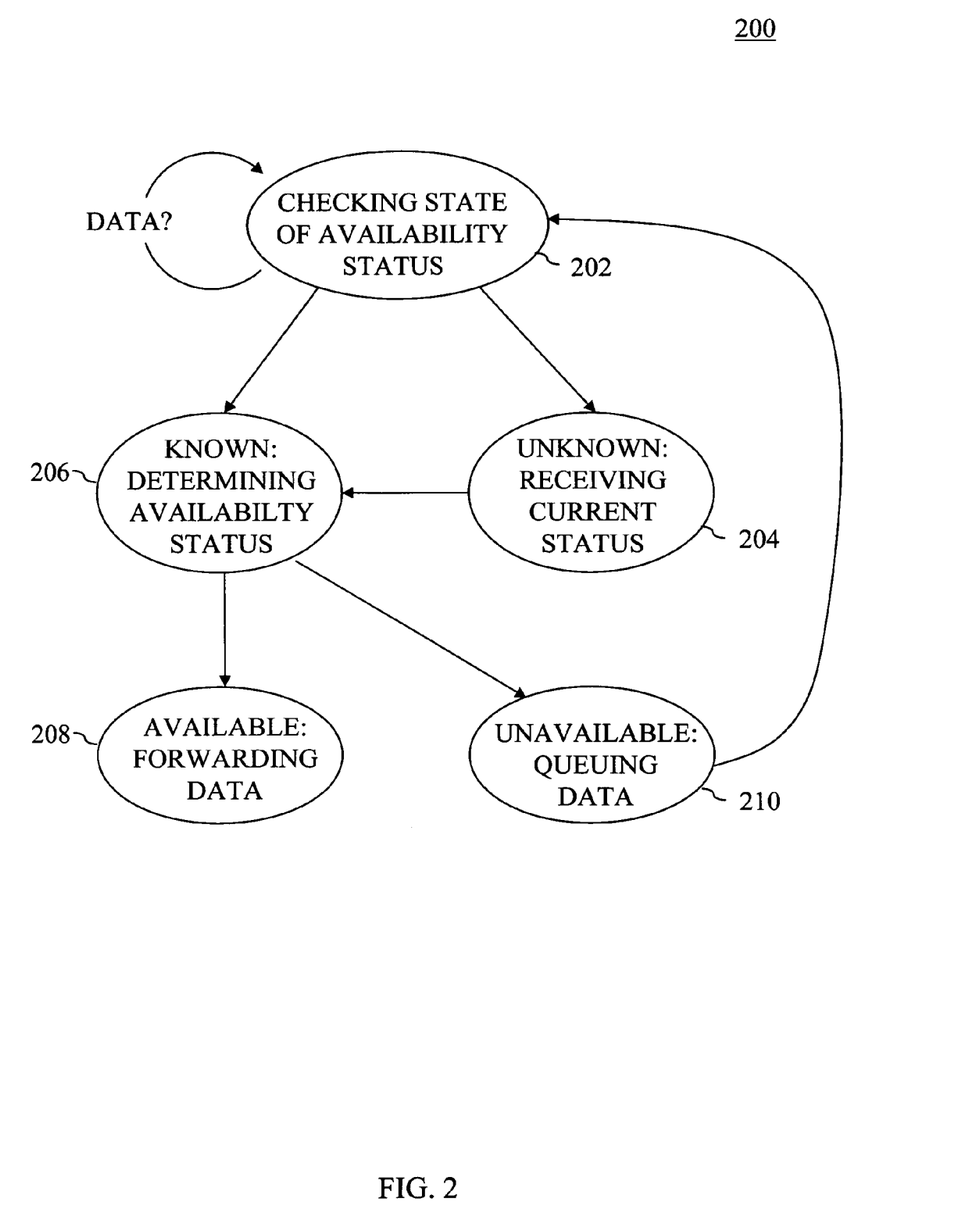
FIG. 2 is an exemplary state diagram of a host service in accordance with at least one of the preferred embodiments.

FIG. 2 is an exemplary state diagram 200 of a host service in accordance with at least one of the preferred embodiments.

In this example, the states of the host service 102 attempting to deliver data to the mobile device 120 are illustrated. In state 202, the host service 102 checks whether the state of the availability status of the mobile device 120 is known upon generating the data to be delivered to the mobile device 120. The data may be generated internally by the host service 102 or may be generated in response to the host service 102 receiving corresponding data from another source. For example, the data may be a message from the host service 102 regarding a service that the host service provides to the mobile device 120 such as Internet web browsing, music downloads, news service, or any other host service specific services originating from the host service 102, or the data may be an e-mail message, sent from an external source and received by the host service 102, to be. delivered to the mobile device 120. The availability status of the mobile device 120 may be, or become, unknown, for example, when the host service 120 initially generates the data having no prior knowledge of the availability of the mobile device 120, a previously stored availability status becomes stale or too old, or the host service encounters a reset condition such as losing connection to the wireless router system 110. If the host service 102 has data for the mobile device 120 and the availability status of in the mobile device 120 is unknown, the host service 102 requests, and receives from, the wireless router system 110 the current status of the mobile device 120 in the wireless router system 110 in state 204, and the availability status of in the mobile device 120 becomes known in state 206. The host service 102 may also receive an updated availability status whenever the availability status at the wireless router system 110 changes. If the host service 102 has data for the mobile device 120 and the availability status of in the mobile device 120 is known, in state 206, the host service 102 determines whether mobile device 120 is available based upon the known availability status. In state 208 where the known availability status of the mobile device 120 equals available, the host service forwards the data to the wireless router system 110. If the known availability status of the mobile device 120 equals unavailable available in state 210, the host service 102 queues the data and returns to state 202.

Figure 3:
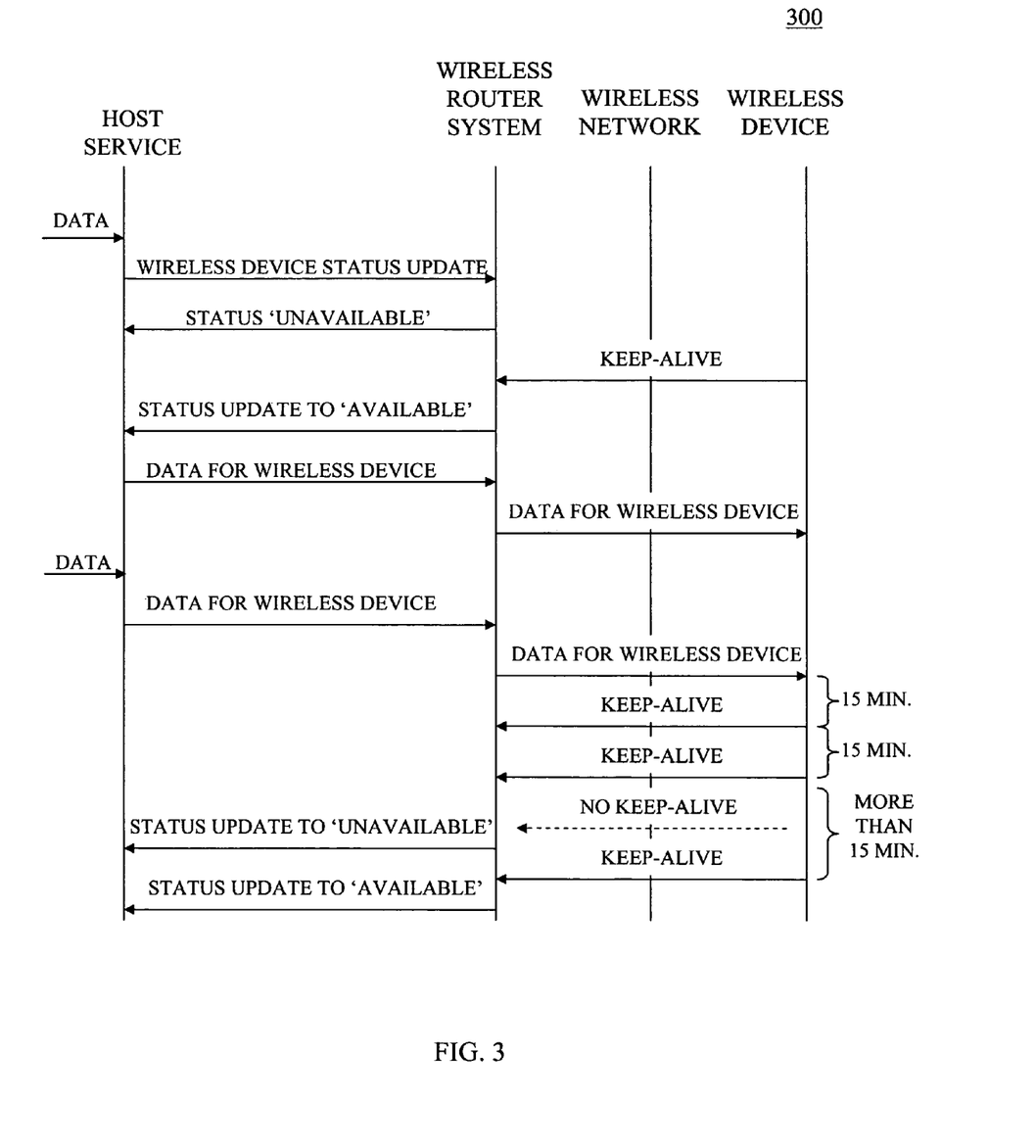
FIG. 3 is an exemplary sequence diagram illustrating a sequence of adaptive delivery of data from a host service to a wireless mobile communication device in a wireless communication system in accordance with at least one of the preferred embodiments.

FIG. 3 is an exemplary sequence diagram 300 illustrating a sequence of adaptive delivery of data from the host service 102 to the mobile device 120 in the wireless communication system 100 in accordance with at least one of the preferred embodiments. When the host service 102 generates data for the mobile device 120 having no known state of the availability status of the mobile device 120, the host service 102 requests the availability status of the mobile device 120 at the wireless router system 110 from the wireless router system 110. In this example, the wireless router system returns the 'unavailable' status to the host service 102, and the data is queued in the host service 102. The host service 102 now has a known availability, status of the mobile device 120, which is 'unavailable.' A while later, the wireless router system 110 receives a 'keep-alive' signal from the mobile device 120, indicating that the mobile device 120 is now available to receive data in the wireless communication system 100 through the wireless network 114, and has an effect of the mobile device 120 establishing a virtual connection with the wireless router system 110. The wireless router system now sends the 'available' status to the host service 102, and the host service 102 forwards the data to the wireless router system 110. The host service 102 now has a known availability status of the mobile device 120, which is 'available.' The wireless router system now transmits the data to the mobile device 120 through the wireless network 114. When the host service 102 generates subsequent set of data for the mobile device 120, the availability status of the mobile device 120 is already know as 'available' and the host service 102 forwards the subsequent set of data to the wireless router system 114. The mobile device 120 is designed to transmit the 'keep-alive' signal at a predetermined time period such as every 15 minutes as shown in FIG. 3, and the wireless router system 110 keeps the current availability status of 'available' as long as the wireless router system 110 receives the keep-alive signal at the predetermined time period interval. FIG. 3 shows the wireless router system 110 receiving two consecutive keep-alive signals at the predetermined time period interval after transmitting the subsequent set of data. Because the wireless router system 110 has received the keep-alive signals at the predetermined time period interval, the availability status of the mobile device 120 is unchanged as available, and the wireless router system does not transmit an updated availability status to the host service 102. However, as shown in FIG. 3, the wireless router system 110 fails to receive the keep-alive signal from the mobile device 120 during the third expected interval. The availability status of the mobile device 120 is now changed to 'unavailable' and the wireless router system 110 transmits the updated availability status of 'unavailable' to the host service 102. The host service 102 then updates the availability status to 'unavailable' such that if any subsequent data for the mobile device 120 is generated while the availability status is 'unavailable,' the host service 102 queues such data. A while later, the wireless router system 110 again receives the keep-alive signal from the mobile device 120, and updates the availability status to 'available.' Because there has been a change in the availability status, the wireless router system transmits the updated availability status of 'available' the host service 102.

Figure 4:
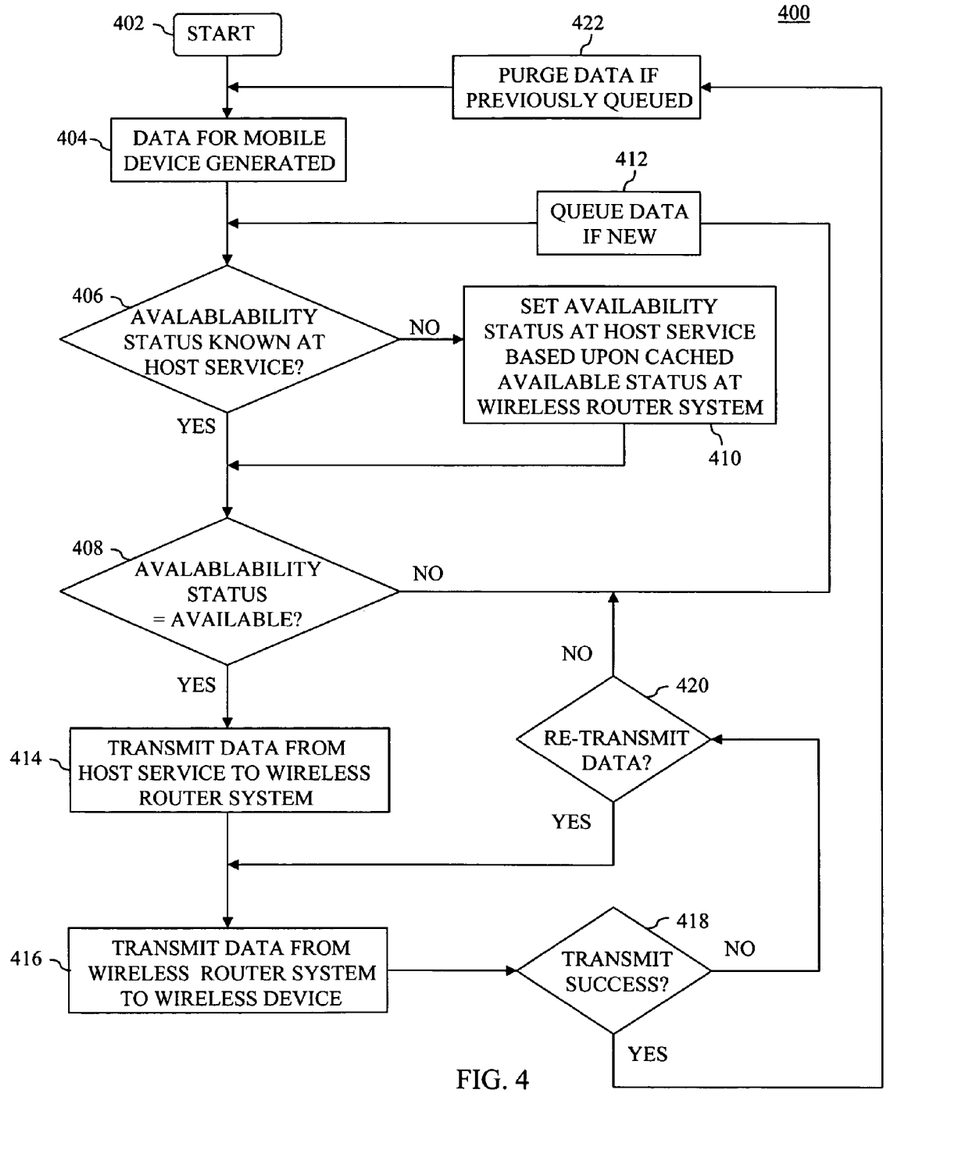
FIG. 4 is an exemplary flowchart illustrating a process of adaptive delivery of data to a wireless mobile communication device in a wireless communication system in accordance with at least one of the preferred embodiments.

FIG. 4 is an exemplary flowchart 400 illustrating a process of adaptive delivery of data to a mobile device in the wireless communication system 100 in accordance with at least one of the preferred embodiments. For the purpose of the illustration, the data to be delivered resides in the host service 102, and the data is to be delivered to the mobile device 120. As previously explained, a host service may be connected to the wireless router system 110 with or without the communication network 108 such as Internet. The process begins in block 402 and data to be delivered to the mobile device 120 is generated in the host service 102 in block 404. The data may be generated internally by the host service 102 or may be generated in response to the host service receiving corresponding data from another source. For example, the data may be a message from the host service 102 regarding a service that the host service 102 provides to the mobile device 120 such as Internet web browsing, music downloads, news service, or any other host service specific services originating from the host service 102, or the data may be an e-mail message, which is sent from an external source and received by the host service 102, to be delivered to the mobile device 120. Initially, such as the very first time the host service 102 is to deliver the data to the mobile device 120, the host service 102 has no knowledge of the availability of the mobile device 120 in the wireless communication system 100. Instead of assuming that the mobile device 120 is available to receive the data and transmitting the data to the mobile device 120, whether the availability status of the mobile device 120 is known at the host service 102 is determined in block 406. Whether the availability status of the mobile device 120 is known at the host service 120 in block 406 may be based upon a stored availability status at the host service 102. The availability status of the mobile device 120 may be deemed to be unknown if there is no stored availability status of the mobile device 120 such as when the process is first initiated and there is no prior stored availability status of the mobile device 120 at the host service 102. Even if the stored availability status of the mobile device 120 is known, it may be deemed to be unknown if the stored availability status becomes stale or too old. The stored availability status may also become unknown if a connection between the host service 102 and the wireless router system 110 is lost.

If the availability status of the mobile device 120 is determined to be known in block 406, the process advances to block 408. However, if the availability status of the mobile device 120 is determined to be unknown in block 406, the availability status of the mobile device 120 at the host service 102 is set equal to a cashed availability status of the mobile device 120 at the wireless router system 110 in block 410. The availability status of the mobile device 120 at the host service 102 now becomes known, and the process advances to block 408. In block 408, the value of the known availability status of the mobile device 120, i.e., available or unavailable, at the host service 102 is determined. For example, the mobile device 120 may be determined to be unavailable because the mobile device 120 is outside of a coverage area provided by the wireless network 114 or is turned off, or the wireless network 114 is unavailable or unable to transmit the message to the mobile device 120.

If the known availability status is determined to equal unavailable in block 408, then the data becomes pending and is queued in the host service 102 in block 412, and the process loops back to block 406. The pending data is only queued in the host service 102 only if the pending data to be queued is new, and is not re-queued if the pending data has been already queued in a previous iteration. Queuing of the pending data at the host service 102 is helpful in preserving resources in the case of recovery from a system related failure such as a lost connection to the wireless router 110. If the known availability status is determined to equal available in block 408, then the data is transmitted from the host service 102 to the wireless router system 110 in block 414. The data is then transmitted from the wireless router system 110 to the mobile device 120 through the wireless network 114 in block 416. In block 418, whether the data transmission to the mobile device 120 has been successful is determined. The successful data transmission from the wireless router system 110 to the mobile device 120 may be determined based upon a confirmation signal transmitted from the mobile device 120 in response to successfully receiving the data. For example, there may be a predetermined time period within which the confirmation signal from the mobile device 120 is expected after the data is transmitted from the wireless router system 110. The availability status of the mobile device 120 at the wireless router system 110 may be re-determining upon the confirmation signal, and the cached availability status at the wireless router system 110 may then be updated with the re-determined availability status. If the data transmission is determined to be successful in block 418, then the process loops back to block 404, and waits for next data. However, if the data transmission is determined to be unsuccessful in block 418, then whether the data should be re-transmitted to the mobile device 120 is determined in block 420. If the data is determined to be re-transmitted, then the process loops back to block 416 where the data is re-transmitted to the mobile device 120. If the data is determined not to be re-transmitted in block 420, then the process advances to block 412 where the data is queued at the host service 102, and the process from block 406 is repeated. However, if the indication signal from the mobile device 120 is received by the wireless router system 110 after the data has been queued in the host service 102, the cached availability status of the mobile device 120 at the wireless router system 110 is updated to "available". The updated cached availability status of "available" is transmitted to the host service 102 from the wireless router system 110, making the available status at the host service 102 in block 408 equal to available. At this time, the pending data, which was previously queued, becomes ready to be delivered to the mobile device 120, and is un-queued. Then the process for determining successful transmission of data to the mobile device 120 from the host service 102, previously described in blocks 414, 416, 418 and 420, is followed. If the transmission of the queued data to the mobile device 120 is determined to be successful in block 418, then the previously queued data, which has now been successfully delivered to the mobile device 120, is purged in block 422. The process then advances to block 404, and waits for next data.

Figure 5:
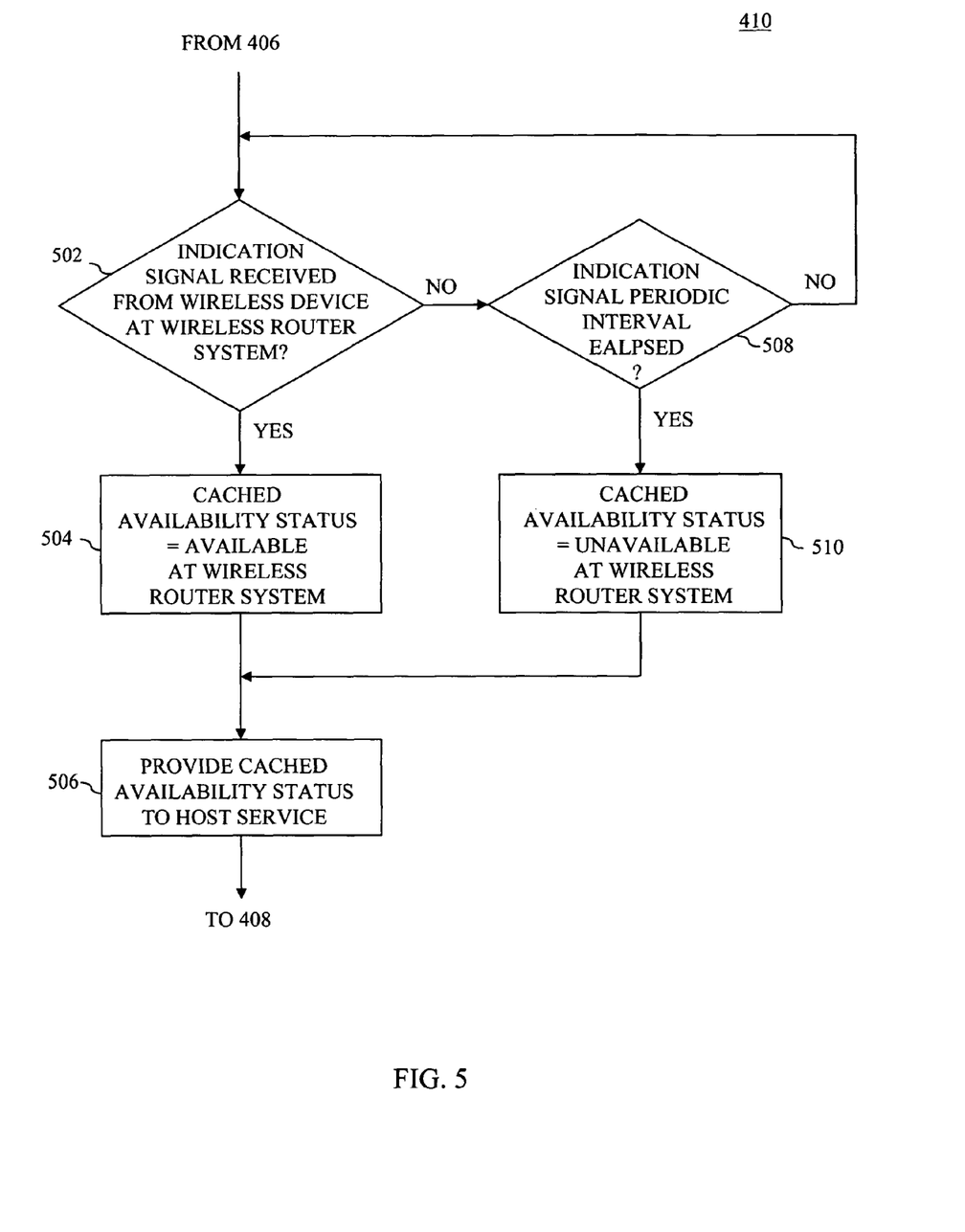
FIG. 5 is an exemplary flowchart further illustrating the process for setting the availability status at the host service based upon the cached availability status at the wireless router system in accordance with at least one of the preferred embodiments.

FIG. 5 is an exemplary flowchart further illustrating the process of block 410 for setting the availability status at the host service 102 based upon the cached availability status at the wireless router system 110 in accordance with at least one of the preferred embodiments. The cached availability status of the mobile device 120 at the wireless router system 110 may be based upon an indication signal transmitted from the mobile device 120. The indication signal, sometimes referred as a "heart beat" or a "keep-alive" signal, may be periodically transmitted by the mobile device 120, and if it is received by the wireless router system 110, it generally indicates that the mobile device 120 is available, or in a coverage area of the wireless network 114, and has an effect of the mobile device 120 establishing a virtual connection with the wireless router system 110. The indication signal, however, may also indicate unavailability of the mobile device 120 in the wireless communication system 100. For example, the mobile device 120 may have a very limited memory space left and is unable to receive further data, or due to its low battery status, its wireless communication ability may begin to shut down to conserve the battery power. The indication signal may include a plurality of functionality states of the wireless device 120 such as, but not limited to, the available memory space, battery status, and received signal strength indicator ("RSSI"). In this example for simplicity, the indication signal from the mobile device 120 is used to illustrate that the mobile device 120 is available in the wireless communication system 100.

In block 502, whether the indication signal from the mobile device 120 is received at the wireless router system 110 is determined. If it is determined that the indication signal has been received, then the cached availability status of the mobile device 120 at the wireless router system 110 is set to be "available" in block 504. If the cached availability status had previously been set to "unavailable" then it is re-set to be "available" in block 504. The process then advances to block 506. If the indication signal is determined not to have been received, then whether the indication signal periodic interval has elapsed is determined in block 508. If the indication signal periodic interval is determined not to have elapsed, then the process loops back to block 502. As long as the indication signal is received periodically at, or within, the indication signal periodic interval, the cached availability status of the mobile device 120 is kept equal to available. However, if the indication signal periodic interval is determined to have elapsed in block 508, then the cached availability status of the mobile device 120 at the wireless router system 120 is set to be "unavailable" in block 510. If the cached availability status had previously been set to "available" then it is re-set to be "unavailable" in block 510. The process then advances to block 506. In block 506, the cached availability status of the mobile device 120, either available or unavailable, at the wireless router system 110 is provided to the host service 102, setting the availability status to be known at the host service 102.

Figure 6:
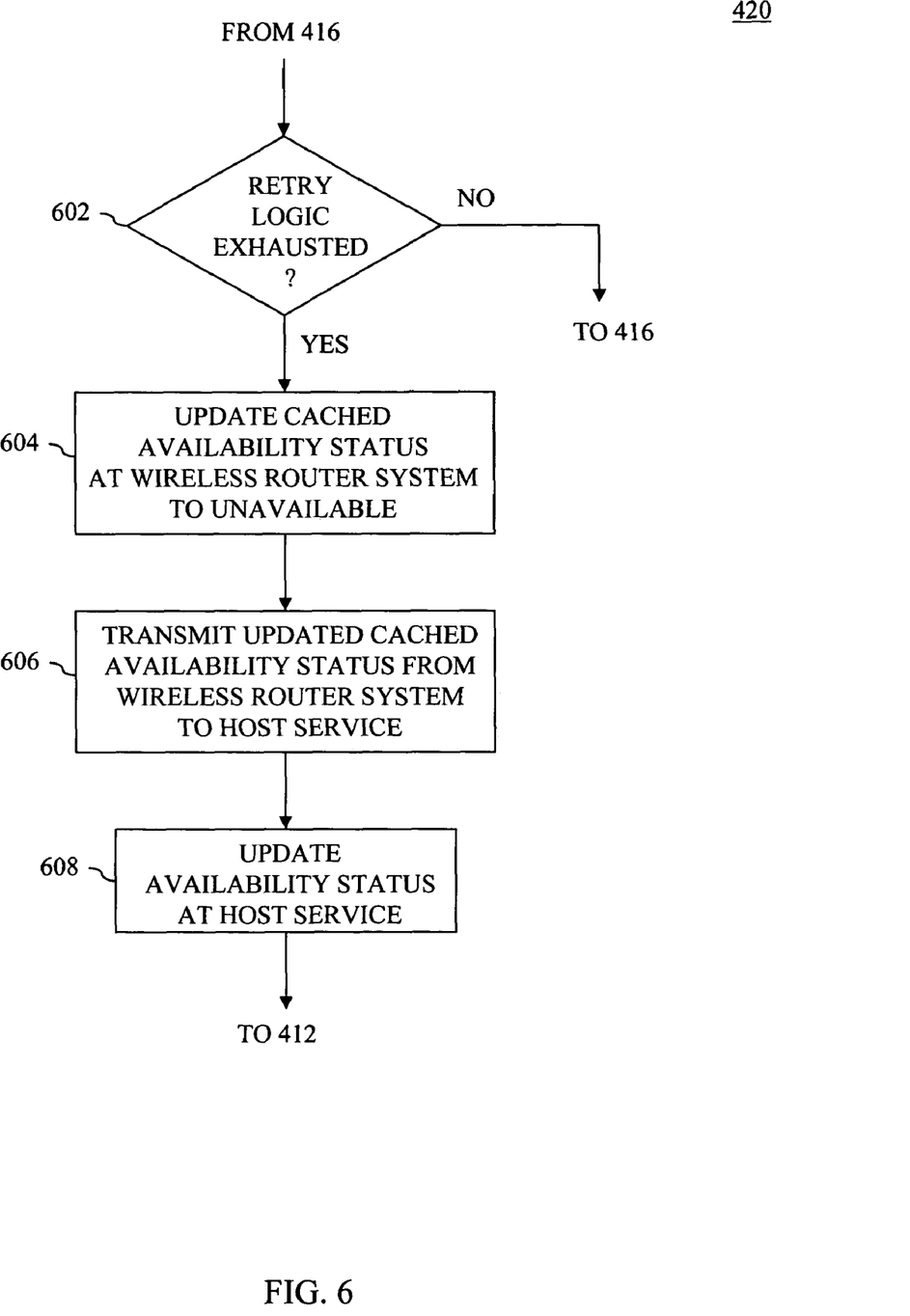
FIG. 6 is an exemplary flowchart further illustrating the process for determining whether to re-transmit the data from the wireless router system to the mobile device in accordance with at least one of the preferred embodiments.

FIG. 6 is an exemplary flowchart further illustrating the process of block 420 for determining whether to re-transmit the data from the wireless router system 110 to the mobile device 120 as a result of the data transmission being determined to be unsuccessful in block 418 in accordance with at least one of the preferred embodiments. In block 602, whether predetermined re-try logic has been exhausted is determined. The predetermined re-try logic may include, and may be any combination of, a maximum number of re-transmissions, a maximum overall time of re-transmissions, and a maximum back-off time. When implementing a delivery system in a wireless network, it is common to use a progressive back-off method for re-transmitting data to a destination device. If the re-try logic has not been exhausted, then the process loops back to block 416 where the data is re-transmitted from the wireless router system 110 to the mobile device 120. However, if the re-try logic is exhausted, meaning that no confirmation signal has been received, the mobile device 120 is deemed to be unavailable and the cached availability status at the wireless router system 110 is updated to "unavailable" in block 604. The updated cached availability status is communicated from the wireless router system 110 to the host service 102 in block 606, and the availability status of the mobile device 120 at the host service 102 is updated to "unavailable." The process then advances to block 412 where the data is queued in the host service 102.

Because it takes a finite amount of time between when the mobile device 120 is determined to be available to receive the generated data and when the data is transmitted from the wireless router system 110 to the mobile device 120, there may be a change in the availability status of the mobile device 120 during that time. To address this concern, additional steps may be provided between block 414, in which the data is transmitted from the host service 102 to the wireless router system 110, and block 416, in which data is transmitted from the wireless router system 110 to the mobile device 120. For example, instead of solely relying on the availability status of the mobile device 120 at the host service 102, the availability status of the mobile device 120 may be evaluated at the wireless router system 110 when the data is transmitted from the host service 102 to the wireless router service 110 based upon the current cached availability status at the wireless router system 110. The decision whether to further transmit the data from the wireless router system 110 to the mobile device 120 then may be made based upon the evaluated cached availability status of the mobile device 120. If the evaluated cached availability status is "available", then the data is transmitted from the wireless router system 110 to the mobile device 120 in block 416, and the process previously described is followed. However, if the evaluated cached availability status is "unavailable", then the availability status of the mobile device 120 at the host service 102 is updated to "unavailable", and the data is queued at the host service 102 in block 412.

Figure 7:
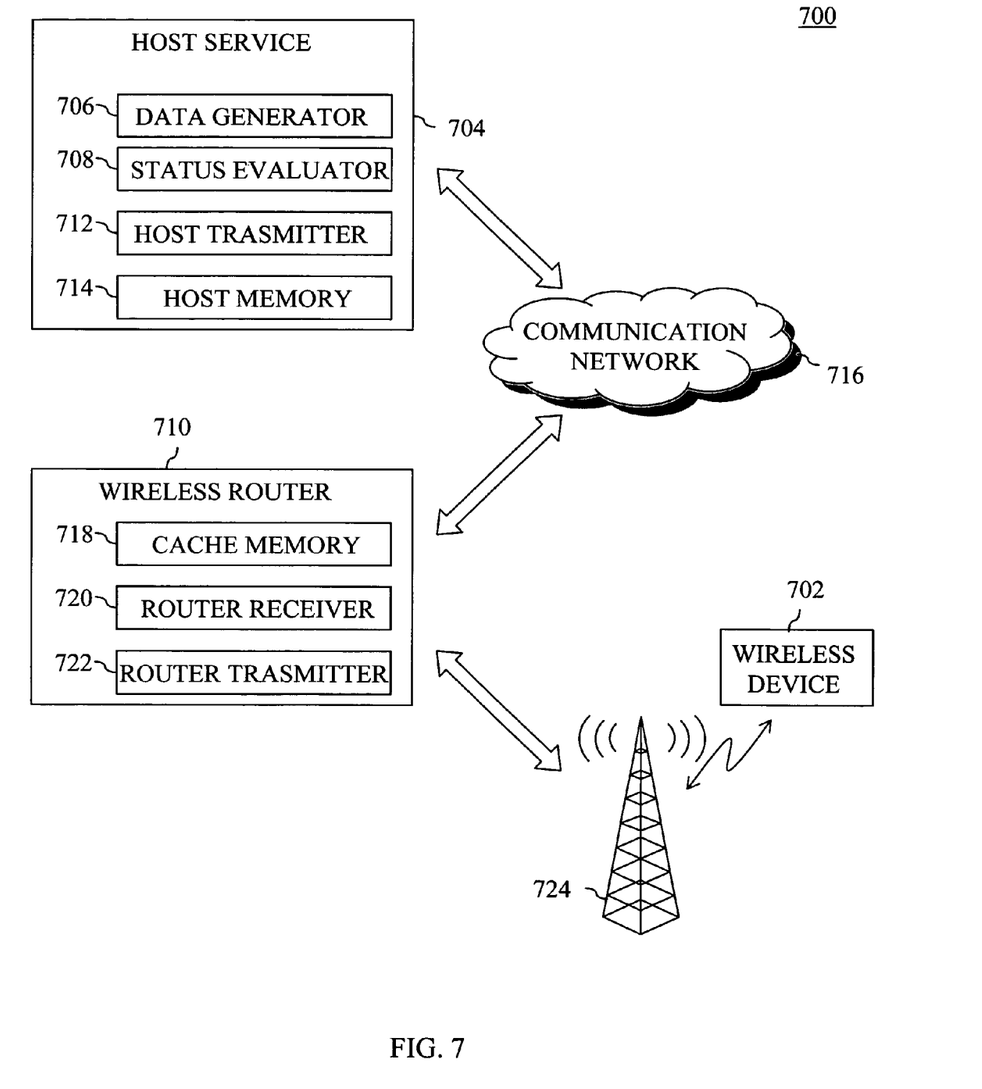
FIG. 7 is an exemplary block diagram of a wireless communication system configured to adaptively deliver data to a wireless mobile communication device in the wireless communication system in accordance with at least one of the preferred embodiments.

FIG. 7 is an exemplary block diagram of a wireless communication system 700 configured to adaptively deliver data to a wireless mobile communication device ("mobile device") in the wireless communication system 700 in accordance with at least one of the preferred embodiments. Although the wireless communication system 700 may include a plurality of host services, wireless networks, and wireless devices as previously shown in FIG. 1, the wireless communication system 700 in FIG. 7 is shown with a reduced number of elements for simplicity. The wireless communication system 700 includes a mobile device 702, and a host service 704, which includes a data generator 706 configured to generate data to be delivered to the mobile device 702. The data generator 706 may generate the data to be delivered to the mobile device 702 in response to receiving corresponding data. The host service 704 also includes a status evaluator 708 configured to determine whether an availability status of the wireless device 702 in the wireless communication system 700 is known. The host service 704 is coupled to a wireless router system 710, and has a host transmitter 712 that transmits the data to the wireless router system 710 if the known availability status of the mobile device 702 equals available. The host service 704 also has a host memory 714, and queues the data in the host memory 714 if the known availability status equals unavailable. The host service 704 only queues the data in the host memory 714 only if the data to be queued is new and does not re-queue the data that has already been queued in a previous iteration. The host service 704 may be coupled to the wireless router system 710 through a communication network 716, which may be a wide area network such as Internet, and is configured to allow communication between the host service 704 and the wireless router system 710.

The wireless router system 710 includes a cache memory 718 configured to cache the availability status of the mobile device 702 in the wireless communication system 700. The wireless router system 710 also includes a router receiver 720 configured to receive the data from the host service 704, and a router transmitter 722 configured to transmit the data to a wireless communication network 724. The wireless communication network 724 is coupled to both the wireless router system 710 and the mobile device 702, and is configured to receive the data from the wireless router system 710 and to transmit the data to the mobile device 702. The wireless communication network 724 may be a cellular telephone network, a two-way paging network, a short range wireless network such as Bluetooth™ and IEEE 802.11 compliant network, and others alike, which is compatible with the mobile device 702.

If the status evaluator 708 determines that the availability status of the mobile device 702 in the wireless communication system 700 is not known, then the status evaluator 708 sets the cached availability status stored in the cache memory 718 as the known availability status. If the known availability status equals available, the host transmitter 712 transmits the data to the wireless router system 710. If the known availability status equals unavailable, the host service 704 queues the data in the host memory 714. The data generator 706 may treat the queued data in the host memory 714 as generated data.

The status evaluator 708 may also determine the availability status of the mobile device 702 based upon a stored availability status at the host service 704, for example in the host memory 714. The status evaluator 708 may determine that the availability status at the host service 704 is unknown if there is no stored availability status, or if a predetermined time period has passed since the availability status has been stored, meaning the stored availability status is too old. The status evaluator 708 may also determine that the availability status at the host service 704 is unknown if a connection between the host service 704 and the wireless router system 710 is lost.

At the wireless router system 710, the cached availability status of the wireless device 702 may be based upon an indication signal from the wireless device 702. The indication signal may sometimes be referred as a "heart beat" or a "keep-alive" signal. If the wireless router system 710 receives the indication signal, for example by the router receiver 720, it indicates that the wireless device 702 is available, or in a coverage area of the wireless network 724. The indication signal may include various states of the wireless device 702 in addition to an indication being available to receive the data from the host service 704 such as, but not limited to, current location based on a Global Positioning System ("GPS") data, battery status, memory status, transmits power level, receive signal strength indicator ("RSSI") value, and other parameters. If the wireless router system 710 receives the indication signal from the mobile device 702, the wireless router system 710 makes the cached availability status of the wireless device 702 equal to available in the cache memory 718. If the wireless router system 701 fails to receive the indication signal from the wireless device 702, the wireless router system 710 makes the cached availability status of the wireless device 702 equal to unavailable in the cache memory 718.

The wireless device 702 may transmit the indication signal periodically, and the wireless router system 710 may keep the cached availability status in the cache memory 718 equal to available if the wireless router system 710 receives the indication signal from the mobile device 702 periodically at a predetermined interval. Conversely, if the wireless router system 710 fails to receive the indication signal from the mobile device 702 periodically at a predetermined interval, the wireless router system may change the cached availability status to unavailable, and transmit the changed cached availability status to the host service 704, for example, by the router transmitter 722, causing the status evaluator 708 to update the known availability status to unavailable. The cached availability status may be changed back to available when wireless router system 710 once again receives the indication signal from the mobile device 702, and may transmit the changed cached availability status, now back to available, to the host service 704. If there is queued data at the host service 704 at this time, then the host transmitter 712 transmits the queued data to the wireless router system 710.

After the router transmitter 722 transmits the data to the mobile device 702, the wireless router system 710 may determine whether the data transmission to the wireless device 702 has been successful based upon a confirmation signal transmitted from the wireless device 702 in response to successfully receiving the data. The wireless router system 710 may then re-determine the availability status of the wireless device 702 based upon the confirmation signal, and update the cached availability status in the cache memory 718 with the re-determined availability status. The wireless router system 710 may be configured to receive the confirmation signal within a predetermined time period after transmission of the data to the mobile device 702, and to re-transmit the data to the mobile device 702 until predetermined re-try logic is exhausted if the wireless router system 710 fails to receive the confirmation signal within the predetermined time period. The predetermined re-try logic may one or any combination of a maximum number of re-transmissions, a maximum overall time of re-transmissions, and a maximum back-off time. When implementing a delivery system in a wireless network, it is common to use a progressive back-off method for re-transmitting data to a destination device. If the wireless router system 710 fails to receive the confirmation signal after the predetermined re-try logic is exhausted, then the wireless router system 710 updates the cached availability status in the cache memory 718 of the mobile device 702 to unavailable. The wireless router system 710 then transmits the updated cached availability status to the host service 704, which updates the availability status of the mobile device 702 to unavailable and to queue the data in the host memory 714. However, if the indication signal from the mobile device 702 is received by the wireless router system 710 after the data has been queued in the host memory 714, the cached availability status of the mobile device 702 at the wireless router system 710 is updated to "available". The updated cached availability status of "available" is transmitted to the host service 704 from the wireless router system 710, making the status evaluator 708 to set the availability status at the host service 702 to equal available. The wireless router system 710 then determines whether the transmission of queued data to the mobile device 702 has been successful as previously described. If the wireless router system 710 determines that the transmission of the queued data to the mobile device 702 has been successful, then the host service 704 purges the previously queued data, which has now been successfully delivered to the mobile device 702, from the host memory 714.

Because it takes a finite amount of time between when the wireless router system 710 determines that the mobile device 702 is available and when the router receiver 720 receives the data from the host service 704, it is possible for the mobile device 702 to have changed the availability status during that time. To address this possibility, the wireless router system 710 be configured to evaluate the cached availability status of the mobile device 702 after receiving the data from the host service 704 but before transmitting the data to the mobile network 724. If the evaluated cached availability status is equal to available, then the router transmitter transmits the data to the mobile device 702 through the wireless communication network 724. The determination of a successful reception of the data by the mobile device 702, re-transmission of the data, updating of the cached availability status and availability status at the host service 704, and queuing of the data may be performed as previously described.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for use in delivering data from the host service to a wireless mobile communication device operative in a wireless communication network, the host service being configured to maintain in a host memory an availability status indicative of the availability of the mobile device in the wireless communication network, the method comprising:
   generating the data at the host service;
   identifying whether the availability status of the mobile device in the host memory is known;
   if the availability status is known at the host service, then:
      transmitting the data from the host service to a wireless router system if the known availability status at the host service equals available, so that the wireless router system is able to send the data to the wireless communication network for transmission to the mobile device;
      queuing the data at the host service without transmission to the wireless router system if the known availability status equals unavailable;
   wherein the cached availability status in the cache memory of the wireless router system is set based on an indication signal from the mobile device, the indication signal indicating one or more functional states or parameter levels of the mobile device; when the cached availability status in the cache memory equals to available: in response to the wireless router system failing to receive the indication signal from the mobile device within a predetermined interval, or in response to the wireless router system identifying that one or more functional states or parameter levels of the indication signal are indicative of unavailability: changing the cached availability status from available to unavailable and transmitting the changed availability status from the wireless router system to the host service; when the cached availability status in the cache memory equals to unavailable; in response to the wireless router system receiving the indication signal from the mobile device where the one or more functional states or parameter levels of the indication signal are indicative of availability: changing the cached availability status from unavailable to available and transmitting the changed availability status from the wireless router system to the host service; and setting, as the known availability status at the host service, the cached availability status received from the wireless router system.

2. The method of claim 1, further comprising:
transmitting the data from the wireless router system to the mobile device if the known availability status at the host service equals available.

3. The method of claim 2, wherein the wireless router system is coupled to the wireless communication network through a communication network comprising the Internet.

4. The method of claim 3, wherein generating the data at the host service includes:
generating the data in response to receiving corresponding data; and
queuing the data at the host service.

5. The method of claim 4, after queuing the data at the host service, further comprising:
updating the cached availability status of the mobile device in the cache memory to available if the wireless router system receives the indication signal;
transmitting the updated cached availability status of available to the host service from the wireless router system;
transmitting the queued data from the host service to the wireless router system; and
purging the queued data from the host service if the transmission to the mobile device is successful.

6. The method of claim 5, further comprising at least one of:
setting the availability status in the host memory to unknown if there is no stored availability status at the host service;
setting the availability status in the host memory to unknown if a predetermined time period has passed since storing the availability status; or
setting the availability status in the host memory to unknown if a connection between the host service and the wireless router system is lost.

7. The method of claim 5, after transmitting the data from the wireless router system to the mobile device, further comprising:
determining whether the data transmission from the wireless router system to the mobile device has been successful based upon a confirmation signal transmitted from the mobile device in response to successfully receiving the data;
re-determining the availability status of the mobile device in the cache memory based upon the confirmation signal; and
updating the cached availability status in the cache memory with the re-determined availability status.

8. The method of claim 7, wherein determining whether the data transmission from the wireless router system to the mobile device has been successful based upon the confirmation signal transmitted from the mobile device in response to successfully receiving the data includes:
receiving the confirmation signal within a predetermined time period after transmitting the data from the wireless router system to the mobile device; and
if the wireless router system fails to receive the confirmation signal within the predetermined time period, re-transmitting the data from the wireless router system to the mobile device until predetermined re-try logic is exhausted.

9. The method of claim 8, wherein the predetermined re-try logic includes at least one of:
a maximum number of re-transmissions,
a maximum overall time of re-transmissions, and
a maximum back-off time.

10. The method of claim 9, if the wireless router system fails to receive the confirmation signal after the predetermined re-try logic is exhausted, further comprising:
updating the cached availability status of the mobile device in the cache memory to unavailable;
transmitting the updated availability status of unavailable to the host service from the wireless router system; and
queuing the data at the host service.

11. The method of claim 5, after transmitting the data from the host service to the wireless router system, further comprising:
evaluating the cached availability status of the mobile device in the cache memory;
if the evaluated cached availability status is equal to available,
transmitting the data from the wireless router system to the mobile device;
re-determining the cached availability status of the mobile device in the cache memory based upon a confirmation signal from the mobile device of successful reception of the transmitted data; and
updating the cached availability status in the cache memory with the re-determined availability status; and
if the evaluated cached availability status is equal to unavailable;
updating the availability status of the mobile device in the host memory based upon the evaluated cached availability status at the wireless router system; and
queuing the data at the host service.

12. The method of claim 11, wherein re-determining the cached availability status of the mobile device based upon the confirmation signal from the mobile device of successful reception of the transmitted data includes:
receiving the confirmation signal within a predetermined time period after transmitting the data from the wireless router system to the mobile device; and
if the wireless router system fails to receive the confirmation signal within the predetermined time period, re-transmitting the data from the wireless router system to the mobile device until predetermined re-try logic is exhausted.

13. The method of claim 12, wherein the predetermined re-try logic includes at least one of:
a maximum number of re-transmissions,
a maximum overall time of re-transmissions, and
a maximum back-off time.

14. The method of claim 1, wherein the one or more functional states or parameter levels indicated in the indication signal comprises a battery status of the mobile device.

15. The method of claim 1, wherein the one or more functional states or parameter levels indicated in the indication signal comprises a memory status of the mobile device.

16. The method of claim 1, wherein the one or more functional states or parameter levels indicated in the indication signal comprises a received signal strength indicator (RSSI) value of the mobile device.

17. The method of claim 1, maintaining communication with the wireless router system which is coupled between the host service and the wireless communication network but external to the wireless communication network.

18. A communication system configured to deliver data to a wireless mobile communication device, the communication system comprising:
- a host service including a host memory, the host service being configured to maintain in the host memory an availability status indicative of the availability of the mobile device in a wireless communication network, to generate data to be delivered to the mobile device, to identify whether the availability status of the mobile device in the host memory is known; to transmit the data to a wireless router system if the known availability status equals available so that the wireless router system is able to send the data to the wireless communication network for transmission to the mobile device, and to queue the data without transmission if the known availability status equals unavailable;
- the wireless router system including a cache memory, and communicating between the host service and the wireless communication network, the wireless router system being configured to determine and cache the availability status of the mobile device in its cache memory based on an indication signal from the mobile device which is indicative of one or more functional states or parameter levels of the mobile device, to receive the data from the host service, and to transmit the data to the wireless communication network for delivery to the mobile device;
- the wireless router system being further configured to, when the cache availability status in the cache memory equals to available: in response to failing to receive the indication signal from the mobile device within a predetermined interval or in response to identifying that one or more functional states or parameter levels of the indication signal are indicative of unavailability, change the cached availability status from available to unavailable and send the changed availability status from the wireless router system to the host service; the wireless router system being further configured to, when the cached availability status in the cache memory equals to unavailable: in response to receiving the indication signal from the mobile device where the one or more functional states or parameter levels of the indication signal are indicative of availability, change the cached availability status from unavailable to available and send the changed availability status from the wireless router system to the host service; and
- the host service being further configured to, set as the known availability status at the host service the cached availability status received from the wireless router system.

19. The communication system of claim 18, wherein the data generated includes:
- the data generated in response to the host service receiving corresponding data, and
- the data queued at the host service.

20. The communication system of claim 19, wherein, if the wireless router system receives the indication signal after the data is queued at the host service, the wireless router system is further configured to:
- update the cached availability status of the mobile device to available,
- transmit to the host service the updated the availability status of the mobile device,
- receive the queued data from the host service, and
- transmit the queued data to the mobile device.

21. The communication system of claim 20, wherein the host service is further configured to purge the queued data if the transmission of the queued data to the mobile device is successful.

22. The communication system of claim 21, wherein the host service is further configured to set the availability status in the host memory to unknown if:
- there is no stored availability status,
- a predetermined time period has passed since the availability status has been stored, or
- a connection between the host service and the wireless router system is lost.

23. The communication system of claim 21, wherein, after the wireless router system transmits the data to the mobile device, the wireless router system is further configured to:
- determine whether the data transmission to the mobile device has been successful based upon a confirmation signal transmitted from the mobile device in response to successfully receiving the data,
- re-determine the availability status of the mobile device based upon the confirmation signal, and
- update the cached availability status with the re-determined availability status.

24. The communication system of claim 23, wherein the wireless router system is further configured to receive the confirmation signal within a predetermined time period after transmission of the data to the mobile device, and to re-transmit the data to the mobile device until predetermined re-try logic is exhausted if the wireless router system fails to receive the confirmation signal within the predetermined time period.

25. The communication system of claim 24, wherein the predetermined re-try logic includes at least one of:
- a maximum number of re-transmissions,
- a maximum overall time of re-transmissions, and
- a maximum back-off time.

26. The communication system of claim 25, wherein, if the wireless router system fails to receive the confirmation signal after the predetermined re-try logic is exhausted, the wireless router system is further configured to:
- update the cached availability status of the mobile device in the cache memory to unavailable,
- cause the host service to update the availability status of the mobile device to unavailable, and
- cause the host service to queue the data.

27. The communication system of claim 21, wherein the wireless router system is further configured to:
- evaluate the cached availability status of the mobile device after the reception of the data from the host service,
- if the evaluated cached availability status is equal to available,
  transmit the data to the mobile device,
  re-determine the cached availability status of the mobile device based upon a confirmation signal from the mobile device of successful reception of the transmitted data, and update the cached availability status with the re-determined availability status,
if the evaluated cached availability status is equal to unavailable,
cause the host service to update the availability status of the mobile device based upon the evaluated cached availability status, and
cause the host service to queue the data.

28. The communication system of claim 27, wherein the wireless router system is further configured to receive the confirmation signal within a predetermined time period after transmission of the data to the mobile device, and to re-transmit the data to the mobile device until a predetermined re-try logic is exhausted if the wireless router system fails to receive the confirmation signal within the predetermined time period.

29. The communication system of claim 28, wherein the predetermined re-try logic includes at least one of:
a maximum number of re-transmissions,
a maximum overall time of re-transmissions, and
a maximum back-off time.

30. The communication system of claim 18, wherein the the one or more functional states or parameter levels indicated in the indication signal comprises a battery status of the mobile device.

31. The communication system of claim 18, wherein the one or more functional states or parameter levels indicated in the indication signal comprises a memory status of the mobile device.

32. The communication system of claim 18, wherein the one or more functional states or parameter levels indicated in the indication signal comprises a received signal strength indicator (RSSI) value of the mobile device.

33. The communication system of claim 18, wherein the wireless router system is external to the wireless communication network.

34. A communication system configured to adaptively deliver data to a mobile device, the communication system comprising:
a host service having a host memory for maintaining an availability status indicative of the availability of the mobile device in a wireless communication network, a data generator configured to generate data to be delivered to the mobile device, a status evaluator configured to identify whether the availability status of the mobile device in the host memory is known, a host transmitter coupled to the data generator and the status evaluator, the host transmitter configured to transmit the data to a wireless router system if the known availability status equals available so that the wireless router system is able to send the data to the wireless communication network for transmission to the mobile device, and the host service configured to queue the data in the host memory without transmission if the known availability status equals unavailable;
the wireless router system having a cache memory, and communicating between the host service and the wireless communication network, the wireless router system being configured to determine and cache the availability status of the mobile device in the cache memory based on an indication signal from the mobile device which is indicative of one or more functional states or parameter levels of the mobile device, the wireless router system being further configured to, when the cache availability status in the cache memory equals to available: in response to failing to receive the indication signal from the mobile device within a predetermined interval or in response to identifying that one or more functional states or parameter levels of the indication signal are indicative of unavailability, change the cached availability status from available to unavailable and send the changed availability status from the wireless router system to the host service; the wireless router system being further configured to, when the cached availability status in the cache memory equals to unavailable: in response to receiving the indication signal from the mobile device where the one or more functional states or parameter levels of the indication signal are indicative of availability, change the cached availability status from unavailable to available and send the changed availability status from the wireless router system to the host service; and
the wireless router system further having a router receiver configured to receive the data from the host service and a router transmitter configured to transmit the data to the wireless communication network for delivery to the mobile device; and
the host service being further configured to receive the cached availability status from the wireless router system and set as the known availability status in the host memory the cached availability status received from the wireless router system.

35. The communication system of claim 34, wherein the data generated includes:
the data generated in response to the host service receiving corresponding data, and
the data queued in the host memory.

36. The communication system of claim 35, wherein the host service is further configured to set the availability status to unknown if:
there is no stored availability status,
a predetermined time period has passed since the availability status has been stored, or
if a connection between the host service and the wireless router system is lost.

37. The communication system of claim 34, wherein the one or more functional states or parameter levels indicated in the indication signal comprises a battery status of the mobile device.

38. The communication system of claim 37, wherein the one or more functional states or parameter levels indicated in the indication signal comprises a memory status of the mobile device.

39. The communication system of claim 37, wherein the router receiver is further configured to receive a confirmation signal within a predetermined time period after the router transmitter transmits the data to the mobile device, and wherein the router transmitter is further configured to re-transmit the data to the mobile device until predetermined re-try logic is exhausted if the router receiver fails to receive the confirmation signal within the predetermined time period.

40. The communication system of claim 39, wherein the predetermined re-try logic includes at least one of:
a maximum number of re-transmissions,
a maximum overall time of re-transmissions, and
a maximum back-off time.

41. The communication system of claim 34, wherein the wireless router system is external to the wireless communication network.

* * * * *